June 17, 1958 G. A. MARSH 2,839,722
METHOD AND APPARATUS FOR DETECTING STRAY CURRENT CORROSION
Filed Dec. 21, 1955
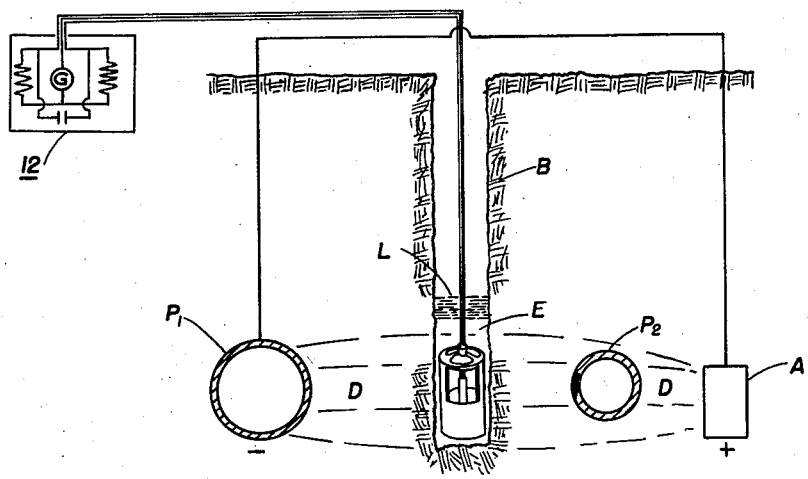
FIG. 1
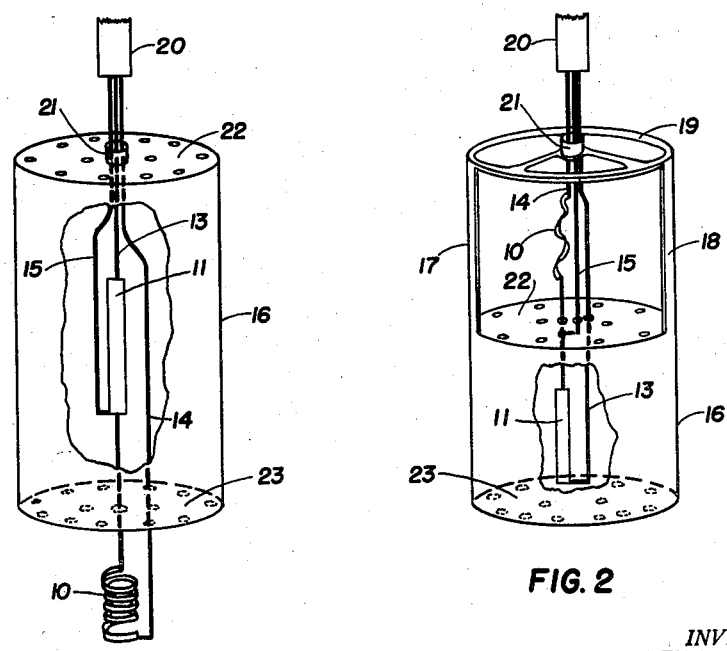
FIG. 3
FIG. 2
INVENTOR.
GLENN A. MARSH
BY
ATTORNEY

United States Patent Office 2,839,722
Patented June 17, 1958

2,839,722

METHOD AND APPARATUS FOR DETECTING STRAY CURRENT CORROSION

Glenn A. Marsh, Crystal Lake, Ill., assignor to The Pure Oil Company, Chicago, Ill., a corporation of Ohio Application December 21, 1955, Serial No. 554,455

6 Claims. (Cl. 324—30)

This invention relates to a method and apparatus for detecting the presence of stray electrical currents in soils which cause corrosion of metallic structures exposed to them.

Because of the susceptibility of underground, submerged, metallic structures such as pipe lines and storage tanks to corrosion, particular care must be taken to prevent the deterioration of the structures. Although the corrosivity of the soil in which metallic structures are buried contributes extensively to corrosion failures, much damage is done by stray-current corrosion. In causing corrosion of this type, the damaging current is derived from a source external to the susceptible structure. These stray currents may emanate from electrical welding systems, cathodic protection systems, electrical plants, electrical railway systems, etc. The damaging, stray currents may be produced from either A. C. or D. C. systems. Although the former are of some concern because of the extent of use of such systems, the corrosion effects from this type of current are negligible compared to those from direct current systems where grounded neutrals are used. In causing stray-current corrosion, part of the electricity generated or induced by such systems passes through the earth. Because the conductivity of the metallic structures is so much greater than that of earth composed of average soils, any buried or submerged metallic structure provides an electrical path of least resistance, and consequently has a propensity for gathering current which may be flowing through the surrounding earth.

Accordingly, successful preventive maintenance programs for structures exposed to stray-current corrosion must include provisions for keeping the structures under surveillance in order to avoid severe damages by the timely discovery of serious exposures, so that remedial action may be taken before serious damage is done to the submerged vessel or pipe. A variety of electrical measurement systems have been developed for use in detecting stray-current corrosion. Generally, such techniques depend upon measuring the various electrical characteristics of the buried metallic structure and require that the structure be electrically inter-connected in the measuring circuit. This requires either that the buried metallic structure be exposed in order that an electrical connection may be made, or that a metal stake be driven into the ground and into contact with the structure which is being surveyed. In systems of this kind, voltage or current measurements and appropriate interpretations are made. However, detection methods in which the buried metallic structure is incorporated in the measuring circuit may give misleading results, are difficult and expensive to make, and may involve exposing the buried metallic structure.

It is therefore an object of this invention to provide a rapid and facile method, which may be used without exposing the buried structure, for detecting stray electric current corrosion. It is another object of this invention to provide an apparatus whereby differential corrosion measurements may be made in order to detect the presence of stray electric currents.

Figure 1 is a schematic diagram of a typical installation of the subject invention when employed in detecting interferences from cathodic protection systems.

Figure 2 is a specific embodiment of one type of corrosion testing unit which is employed in carrying out the instant invention. In this representation, the tubular shielding element is provided with a cutaway section to permit the details of the lower resistance element to be seen.

Figure 3 is an alternative design of the corrosion testing unit in which the respective elements are mounted in reversed positions to those shown in Figure 2.

It is well known that there is a correlation between the change in resistance of a corroding metallic specimen and the extent of corrosion. According to the present invention, it has been found that the change in resistance of metallic specimens, exposed to an electrical field of stray current, can be utilized in detecting the presence of the stray current.

With reference to the drawing, in Figure 2 it will be seen that the corrosion testing unit comprises a pair of thin metallic specimens 10 and 11. Specimen 10 has a helical configuration in order to provide a flat surface in all directions. These specimens are serially connected and form one of the resistance branches of a typical electrical bridge circuit. The other resistance branch of the bridge is mounted in the measurement circuit shown as detecting and measuring network 12. Also provided is a current detecting instrument connected across the resistance branches, and a power source. Because this circuitry is a typical Wheatstone bridge arrangement and is an auxiliary aspect of this invention obvious to one skilled in this art, details are not provided. For additional information on bridge circuits, which can be used in this service, reference is made to Electrical Measurements, Harris, Wiley, 1952. Connected to the terminal ends of specimens 10 and 11 are electrical conductors 13 and 14. Conductor 15 is electrically connected at the intermediate junction between specimens 10 and 11. Specimen 11 is surrounded by tubular shield 16 which is retained in place by opposed support posts 17 and 18, which are diametrically mounted on the periphery of spider 19. Connected to the center of spider 19 is line 20, which serves to raise or lower the corrosion testing unit into the borehole, which is provided for its use. Line 20 preferably consists of a low-resistance, three-conductor, insulated cable having a rope or wire core about which the conductors are wound. The core functions to support the weight of the corrosion testing unit, without putting any strain on the cable conductors. Although not shown in detail, conductors 13, 14, and 15 terminate in a socket element mounted in spider 19. This socket element is part of coupling means 21, which permits the appropriate interconnection to be made between the resistance elements 10 and 11 and the remainder of the bridge circuit 14. This coupling means also permits the unit to be suspended in a borehole. To increase the protection of the shielded element 11 from the corrosive effects of the stray electric current, but permit it to be in contact with the bore-hole fluid, the open ends of the shield element 16 are fitted with perforate closures 22 and 23.

In employing the corrosion testing unit to detect stray currents, as seen in Figure 1, a bore-hole B is dug in the earth to the depth of interest. In this instance, the stray-current field is produced by cathodically-protected, buried pipeline $P_1$ and the sacrificial anode A, such as magnesium, electrically connected thereto. $P_2$ represents a pipeline which is buried within this corrosive environment in the electric field D—D. The corrosion testing unit is lowered into the hole and, in order to insure satisfactory electrical conductivity, a solution of a suitable electrolyte E, such as an aqueous solution of sodium chloride, is deposited in the bore-hole to a depth L, which provides for the complete submergence of the corrosion testing unit. After the corrosion testing unit has been positioned in the bore-hole, the electrical circuit is balanced in the conventional manner. When immersed in the bore-hole, the corrosion of specimens 10 and 11 is initiated. If there is no stray-current field present, the specimens will corrode essentially at the same rate, and there will be no change in the balanced position of the Wheatstone bridge circuit. However, if there is a stray-current electrical field, the unshielded specimen 10 will manifest an incremental acceleration in corrosion rate, which can be measured by the bridge circuit, because the tubular shield surrounding specimen 11 by-passes the electrical field and prevents its affecting the rate of corrosion of strip 11. Stray currents of sufficient intensity to cause interference or corrosion have an effect on the corrosion of the exposed resistance element 10 and manifest themselves in a relatively short time. Accordingly, within a matter of days or hours, the effects of stray currents will become apparent and can be detected.

In fabricating the corrosion testing unit, resistance elements 10 and 11 can be in the form of a thin ribbon, sheet, wire, or foil, having a variety of cross-sectional configurations. However, the resistance elements selected must be substantially identical in composition, electrical characteristics, and cross-sectional configuration. The shielded resistance element can have any design which will permit it to be conveniently installed within the shielding element. Because stray electric currents may be multidirectional, the unshielded element preferably is shaped into a helix, either having an axis coincidental with the planiform material from which it was fabricated, as shown in Figure 2, or one formed by wrapping the planiform material around a cylinder, as shown in Figure 3. This expedient provides a uniform exposure of the element to corrosive environment, and increases the sensitivity of the instrument. However, it does not preclude the use of other geometrical configurations. The size of the unit and construction will depend upon the service in which it is to be employed. Generally, foil-like resistance elements 4 inches to 8 inches long, ¼ inch to 1 inch wide, and having a thickness of 0.001–0.125 inch will provide satisfactory results. Any solid, metallic, electrical conductor susceptible to corrosion when exposed to a stray-current field can be used. However, the resistance elements are preferably made from the same material of construction used in the fabrication of the buried metallic structure under surveillance. The resistance elements of the corrosion testing unit are inter-connected to the detecting electrical network by means of low resistance leads.

The mechanical electrical shield device which surrounds one of the resistance elements of the corrosion testing unit is fabricated from a metallic electrical conductor and is left uninsulated. Although in the illustrative embodiment, a tubular insulator, cylindrical in cross section, is used, other geometrical shapes may be employed to permit the stray-electric-current field to by-pass the resistance element enclosed within the tubular sleeve (vide: Trans. AIEE, 48, 1263, 1929). The shield can be prepared from any electrically conductive material of construction, such as iron, brass, copper, lead, aluminum, etc. Because it functions in this manner, its size and shape will depend upon the size and shape of the shielded resistance element. To provide maximum shielding, the side walls are solid with a means being provided, e. g., perforate end closures, valve means, etc., to permit the conducting fluid within the bore-hole to fill the inside volume of the shield. The sleeve surrounds one of the resistance elements and is suspended by a suitable base element which is attached to, and electrically insulated from, the electrical conductors leading to the detecting apparatus, or to a separate line which serves to support the corrosion testing unit suspended in the bore-hole.

The resistance elements, 10 and 11, are connected to a simple, Wheatstone-bridge-measuring circuit, such as that shown in Figure 1, which functions as the detecting and measuring network. While a simple arrangement of this nature is satisfactory, it is preferred that a more accurate and stable instrument, such as the bridge measurement apparatus described by L. E. Ellison in patent application Serial No. 528,061, filed August 12, 1955, be employed, or other similar bridge circuits well-known in the prior art.

In using the corrosion testing unit, only small amounts of power are employed. It should not be necessary to apply a potential greater than about 100 millivolts. Preferably, the size of the resistance elements should be selected to permit the use of a potential of about 10 to 100 millivolts. However, conditions can exist where potentials outside this range will be used.

In a specific embodiment of this invention, an underground gas main is buried intermediate to a petroleum products pipeline and the sacrificial magnesium anode of the pipeline cathodic protection system. Both the pipeline and the gas main are steel conduits which are buried at an 8-foot depth. The zone suspect of carrying stray currents is penetrated with a 6-inch-diameter bore-hole to a depth of about 10 feet, using a conventional mechanically-driven auger used in soil analysis work. The bore-hole is filled to about the 6-foot level with a 10% aqueous solution of sodium chloride. The corrosion testing unit, comprising a pair of resistance elements 6 inches by ½ inch by 0.01 inch, one shielded by means of a 1-inch diameter steel tubing 7 inches long and having a 0.0625 inch wall thickness, and the other, unshielded and in the form of a helix wound on a 1-inch diameter cylinder, mounted depending from the shielded element, is lowered in the well and secured at about 2 feet from the bottom of the hole. This resistance branch is electrically connected to the bridge-measuring circuit of Ellison, cited supra, and with 50 millivolts A. C. applied thereto, the resulting bridge network is electrically balanced. After the corrosion testing unit remains in place for about 4 hours, the electrical balance is upset, denoting the accelerated corrosion of the unshielded resistance element due to the presence of stray electric current.

The apparatus of the present invention permits the use of electrical measurements in determining the effect of exposure of an underground metallic structure to stray currents. This invention permits making an electrical study of stray currents without requiring the inter-connection of a metallic structure in the measuring network, thereby permitting making an exposure survey in an expeditious manner. Modifications in the illustrative embodiments will be obvious to those skilled in this art, and can be made without departing from the scope of this invention, as defined in the appended claims.

I claim as my invention:

1. An electrical apparatus for detecting subterranean stray electric current, which comprises a first metallic, corrosion-sensitive, electrical resistance element and a second metallic, corrosion-sensitive, electrical resistance element serially interconnected, thereby forming a first resistance branch, said resistance elements being substantially identical in cross-sectional area, composition, and electrical resistance characteristics, and being susceptible to corrosion, a metallic tubular shield surrounding only one of said resistance elements, in spaced relationship therewith and adapted to shield said resistance element from the corrosive effect of said stray electrical current, the ends of said shield being fitted with perforate closures, the other of said resistances being disposed in spaced relationship, outside of said shield, and electrical conductor means for connecting said resistance branch in parallel with a second resistance branch, whereby there is provided an electrical bridge.

2. An electrical apparatus for detecting subterranean stray electric current, which comprises a first metallic, corrosion-sensitive, electrical resistance element and a second metallic, corrosion-sensitive, electrical resistance element serially interconnected, thereby forming a first resistance branch, said resistance elements being substantially identical in cross-sectional area, composition, and electrical resistance characteristics, and being susceptible to corrosion, a metallic tubular shield surrounding only one of said resistance elements, in spaced relationship therewith and adapted to shield said resistance element from the corrosive effect of said stray electrical current, the ends of said shield being fitted with perforate closures, the other of said resistances being helically shaped and disposed in spaced relationship, outside of said shield, and electrical conductor means for connecting said resistance branch in parallel with a second resistance branch, whereby there is provided an electrical bridge.

3. An electrical apparatus for detecting subterranean stray electric current which comprises a first metallic, corrosion-sensitive, electrical resistance element and a second metallic, corrosion-sensitive, electrical resistance element serially interconnected, thereby forming a first resistance branch, said resistance elements being foil-like and substantially identical in cross-sectional area, composition, and electrical resistance characteristics, and being susceptible to corrosion, a metallic tubular shield surrounding only one of said resistance elements, in spaced relationship therewith and adapted to shield said resistance element from the corrosive effect of said stray electrical current, the ends of said shield being fitted with perforate closures, the other of said resistances being helically shaped and disposed in spaced relationship, outside of said shield, and electrical conductor means for connecting said resistance branch in parallel with a second resistance branch, whereby there is provided an electrical bridge.

4. An electrical apparatus for detecting subterranean stray electric current, which comprises a first metallic, corrosion-sensitive, electrical resistance element and a second metallic, corrosion-sensitive, electrical resistance element serially interconnected, thereby forming a first resistance branch, said resistance elements being helically shaped and substantially identical in cross-sectional area, composition, and electrical resistance characteristics, and being susceptible to corrosion, a metallic tubular shield surrounding only one of said resistance elements, in spaced relationship therewith and adapted to shield said resistance element from the corrosive effect of said stray electrical current, the ends of said shield being fitted with perforate closures, the other of said resistances being foil-like and depending downwardly from, and in spaced relationship to said shield, electrical conductor means for connecting said resistance branch in parallel with a second resistance branch, whereby there is provided an electrical bridge, a power source connected across said bridge, means for electrically balancing said bridge, and a current detecting instrument connected across the said branches of said circuit.

5. A method for detecting subterranean stray electric currents emanating from underground electric power networks, which comprises (1) disposing in a bore-hole traversing a zone suspect of having stray electric currents passing therethrough an aqueous solution of an electrolyte, (2) submerging in said solution, in direct contact therewith, a first resistance element, and a second resistance element serially connected, said elements being substantially identical in cross-sectional area, composition, and resistance characteristics, and being susceptible to corrosion, thereby forming a first resistance branch, one of said elements being electrically shielded from any stray electric currents which may be present in said zone, the other of said resistance elements being exposed to the corrosive effects of any stray currents which may be present in said zone, (3) electrically connecting said first resistance branch in parallel with a second resistance branch, said second branch being insulated from any corrosive environment, thereby forming an electrical bridge, (4) applying an electric potential across said bridge and effecting an electrical balance therein, and (5) connecting between said resistance branches a current-detecting meter, whereby any electrical unbalance of said bridge resulting from the accelerated rate of corrosion of the exposed resistance element due to the presence of subterranean stray electric currents can be detected.

6. An electrical apparatus for detecting subterranean stray electric current, which comprises a first metallic, corrosion-sensitive, electrical resistance element and a second metallic, corrosion-sensitive, electrical resistance element serially interconnected, thereby forming a first resistance branch, said resistance elements being substantially identical in cross-sectional area, composition, and electrical resistance characteristics, and being susceptible to corrosion, a mechanical electrical shield surrounding only one of said resistance elements, in spaced relationship therewith, whereby any stray electric currents will by-pass the shielded resistance element, said shield being provided with a means for introducing a fluid into the interior of the shield, the other of said resistances being disposed in spaced relationship, outside of said shield, and electrical conductor means for connecting said resistance branch in parallel with a second resistance branch, whereby there is provided an electrical bridge.

References Cited in the file of this patent
UNITED STATES PATENTS

| | | |
|---|---|---|
| 1,304,208 | Shakespear | May 20, 1919 |
| 2,278,248 | Darrah | Mar. 31, 1942 |
| 2,349,250 | Doan | May 23, 1944 |
| 2,735,754 | Dravnieks | Feb. 21, 1956 |